United States Patent

Whitesell

[15] 3,674,672

[45] July 4, 1972

[54] MULTIPARAMETER PROCESS SOLUTION ANALYZER-CONTROLLER

[72] Inventor: George Whitesell, Northville, Mich.

[73] Assignee: Hooker Chemical Corporation, Niagara Falls, N.Y.

[22] Filed: March 25, 1970

[21] Appl. No.: 22,652

[52] U.S. Cl. ........................ 204/195 R, 118/7, 118/11, 134/56 R, 134/57 R, 134/102, 134/166 R, 134/169, 134/171, 137/93, 138/40, 148/6.15 Z, 324/30 B
[51] Int. Cl. .......................................................... G01n 27/46
[58] Field of Search ............... 118/7, 11; 134/56 R, 57 R, 134/102, 166 R, 166 C, 169 R, 169 C, 171; 137/93; 138/40; 204/1 T, 195; 324/30 A, 30 B

[56] References Cited

UNITED STATES PATENTS

| | | | |
|---|---|---|---|
| 2,707,964 | 5/1955 | Monroe | 137/4 |
| 3,290,584 | 12/1966 | Van Deursen Harms et al. | 324/30 C |
| 1,848,531 | 3/1932 | Lamb et al. | 138/40 |
| 2,046,223 | 6/1936 | Trudel et al. | 138/40 |
| 2,607,718 | 8/1952 | Suthard | 204/195 |
| 3,051,631 | 8/1962 | Harbin et al. | 204/195 |
| 3,118,456 | 1/1964 | St. Palley | 134/57 R |
| 3,312,189 | 4/1967 | McVey | 137/93 |
| 3,515,094 | 6/1970 | McVey | 118/7 |
| 3,566,892 | 3/1971 | Logue et al. | 134/166 R |
| 3,583,413 | 6/1971 | Mertzanis | 134/166 R |

Primary Examiner—T. Tung
Attorney—Stanley H. Lieberstein and William J. Schramm

[57] ABSTRACT

A multiparameter analysis system for the continuous on-stream real-time measurement, surveillance and correction of a process solution. Electrometric methods are employed to measure conductivity and ion concentration of the process solution. An accurate measurement of actual ion concentration is made by continuous automatic titration of a sample of the process solution. This electrometric analysis produces a signal reflecting the results of said analysis that is fed to controller-analyzer means which generate error signals when said solution deviates from a preselected state, which error signal controls means to automatically restore the process solution to the preselected state. The electrometric analysis means are protected by an automatically self-cleaning filter, the cleaning cycle of which is controlled in response to sensed system dynamics. While this system has particular utility in the analysis and control of nitrite in the surface conversion coating of ferriferous metallic objects, it possesses broad spectrum analytical capability including control of pollutants discharged into surface waters and for the quality control of surface waters.

16 Claims, 8 Drawing Figures

| SECONDS | 4 | 8 | 12 | 16 | 20 | 24 | 28 | 32 | 36 | 40 | 44 | 48 | 52 | 56 | 60 |
|---|---|---|---|---|---|---|---|---|---|---|---|---|---|---|---|
| DEGREES | 24 | 48 | 72 | 96 | 120 | 144 | 168 | 192 | 216 | 240 | 264 | 288 | 312 | 336 | 360 |
| PROGRAMMER MOTOR | ▨ | ▨ | ▨ | ▨ | ▨ | ▨ | ▨ | ▨ | ▨ | ▨ | ▨ | ▨ | ▨ | ▨ | ▨ |
| SWa + SWb | | ▨ | ▨ | | | | | | | | | | | | |
| SWc + SWd | ▨ | ▨ | ▨ | | | | | | | | | | | | |
| SWe | | | | | | | | ▨ | | | | | | | |

Fig. 8

MULTIPARAMETER PROCESS SOLUTION ANALYZER-CONTROLLER

BACKGROUND AND SUMMARY OF THE INVENTION

The present invention relates to a multiparameter analysis system for the continuous on-stream real-time measurement surveillance and correction of a process solution by electrometric methods, and more particularly, to the electrometric analysis of the process solution by conductivity and titration analyses and thereafter processing this analytical data to correct the measured parameters of the solution to preselected parameters in the event the measured parameters should deviate from the preselected parameters. More specifically, the invention relates to an improved apparatus for the automatic and continuous real-time control of the treatment of metal surfaces for forming chemical conversion coatings with liquid treating solutions the composition and concentration of which are automatically maintained, producing thereby surface coatings of consistent quality and uniformity.

The need for continuous real-time on-stream automatic analysis of a process solution of a complex nature has been known for a long period of time. However, in practice, it has not proven practical to meet the combined design criteria of automation, reliability, speed and accuracy. Manual sampling and testing with proven laboratory techniques yields very accurate results. However, manual sampling and subsequent laboratory analysis results in undesirable dead time between the time of sampling and the time of ascertainment of the results of the analysis formed. In process work, this information is needed rapidly and the delay in receiving such information results in ineffective process control. Reaction products, changes in process solution composition resulting from process reactions, process work load and accidental spillage and other wastes all produce sudden and unpredictable changes which even frequent manual sampling and subsequent analysis cannot satisfactorily control. Moreover, manual sampling for many tests require special, careful techniques to avoid contamination of the sample, thereby producing erroneous analytical results. Automatic analysis of a process solution provides the means for real time continuous control of a process solution as well as eliminating the potential errors of considerable magnitude inherent in the manual sampling technique.

In the art of automatic analysis of process solutions there are two basic techniques for this purpose. One is the electrochemical sensor approach. The other is the use of time tested wet chemistry techniques. Both techniques have serious disadvantages, which are hereinafter discussed, which disadvantages are both general in nature and are applicable to specific problems as well.

Before discussing these problems, it would appear appropriate to review specific conditions inherent in representative examples of processes to be controlled. For example, in waste water treatment control, the effluent is a variable in both quantity and quality. Changes in raw materials, changes in manufacturing processes, work load changes, process solution management practices, and accidents all effect the condition of the waste water. Such changes must be ascertained rapidly and corrective measures initiated not only to comply with legal requirements, but to avoid bad publicity. Likewise, in the metal treatment art, and in particular, the treatment of metal surfaces for forming chemical conversion coatings, the composition and concentration of complex liquid treating solutions must be carefully controlled in order to produce surface coatings of persistent uniformity and quality. Furthermore, in metal plating optimum solution parameter measurement and control improves the throwing power of a plating solution, and are used to continuously monitor the various operations used in preparing the base metal for plating.

Electrochemical sensors are varied. Among the most useful are those which measure pH, oxidation reduction potential (hereinafter termed "Redox" or "ORP") and conductivity. The pH sensor serves to measure active hydrogen ion concentration in a solution, determining whether a solution is acidic or basic. The Redox or ORP sensor measures changes in the ratio of reducing agent to oxidizing agent, and is an analog quantity reflecting the progress of a reaction. Conductivity sensors measure the total dissolved ionized solids in a solution. It should be noted that all the foregoing do not provide a measure of specific ion concentration. They serve to measure specific ion activity. However, ion activity cannot be equated with ion concentration. It is possible, of course, to develop a correlation curve between activity and concentration in applications where total ionized solids are static and do not change. However, the dynamics of process work, as previously shown, are such to render such a condition a rarity.

Since the measurement of specific ion concentration is most desirable in process control work, a wet chemistry technique is needed. Conventionally, colormetric titration techniques are used for this purpose, which provide accurate results. However, such systems all depend on optical systems to measure the color developed. For this reason, such systems are relatively complex requiring substantial maintenance, and consequent down time. Thus, a simpler system using electrometric analysis was desired. When such systems were developed, they were batch type analyzers following the same steps used in laboratory titrations. While reliable, such systems had an undesirable dead time while such analyses were being performed and did not provide continuous real-time control of a process. By the time the analysis was completed, the composition of the solution has changed and the information produced was ineffective for control purposes.

All of these electrochemical measurement systems require an undesirable amount of maintenance. Such maintenance largely results from fouling of electrodes by the process solution being analyzed. Various schemes have been tried in attempts to prevent fouling of the sensor electrodes. Scrubbing and wiping mechanisms have been employed. Other mechanical expedients have been proposed such as ultrasonic cleaning, steam cleaning, and use of high flow velocities. An electrochemical method has been devised using a third electrode. However, these methods, as well as other mechanical and cleaning methods well-known to analytical chemists, have not met with success. This is due to the presence of matter in the solution being analyzed which continually fouls the electrodes. For example, in a pulp chlorination process, the pulp fibers bridge the space between the electrodes. Where the solution to be controlled contains proteins, hydrophobic colloids or the like, such materials will adhere to the surface of the electrodes and introduce an error. In the surface conversion finishing field where a phosphate coating is produced on ferriferous metal surfaces, the electrodes become fouled by an adherent coating of ferric phosphate, as well as other contaminants derived from the components of the solution. For such reasons, it has been recognized that the solution to this problem required the removal of the contaminants prior to the solution being introduced to the electrochemical sensing means. While filtration was a means to do this, filters require frequently cleaning also, and the down time involved in filter removal for cleaning or replacement could not be tolerated in an automatic analysis and control system.

While the present invention is useful in connection with the general control of process solutions as discussed above, it is particularly useful with phosphate coatings solutions for ferriferous materials containing metal ions such as zinc accelerated by soluble nitrite. In such a process, the solution accumulates ferrous ions from work in process, which is oxidized into the ferric form by such a nitrite to form an insoluble compound. Such a solution would usually contain phosphoric acid and a metal salt of phosphoric acid such as zinc. In order to expedite the speed of formation of the coating, nitrite is added in such amounts that it operates to accelerate the reaction as well as oxidize the ferrous ion. When the reaction is accelerated, it becomes very rapid and, for such reason, presents a serious control problem. A sufficient nitrite concentration must always be maintained, and to ensure acceptable results, a level of nitrite concentration in excess of that stoichiometrically required to oxidize the ferrous ion present. In a production line where work is continually in process, ferrous ions continually enter the solution and nitrite must be added continuously. In the past, control of the addition of nitrite could not be controlled directly. Nitrite concentration was monitored by periodic manual titrations, and makeup nitrite was manually added in a quantity thereby indicated. Because of the dead time involved, as previously discussed, such results did not present real-time process control data. As a result, the control of nitrite concentration was a manual art dependent on the skill and judgment of a human controller. Thus, the process was subject to human error, as well as inherent delay in available data.

However, with the system of the present invention, there is provided a versatile system for the continuous on-stream real-time electrometric analysis of a plurality of parameters in a process solution, which is protected against inaccuracies resulting from electrode fouling by the provision of self-cleaning filtration means and which has the capability to automatically measure and control specific ion concentration by automatic continuous electrometric titration.

It is therefore, an object of the present invention to provide an automatic multiparameter analyzer for the measurement, surveillance, control, and correction of a process solution, which analyzer is designed specifically to meet the problems of industrial process control.

Another object of the invention is to provide an on-stream analyzer of the above type which employs electrometric sensors to provide continuous data which can be processed to provide real-time process control.

Still another object of the invention is to provide an industrial process type analyzer of the above type which includes among its multiparameter capability the capability to measure, monitor, control and correct at least one specific ion concentration, in addition to measurements of ion activity.

Yet another object of the invention is to provide a multiparameter analyzer of the above type in which the electrometric sensors are protected against fouling, thereby insuring durability, accuracy and reliability in the production of precision read-out through the maintenance of the sensitivity of the sensors.

Still another object of the invention to provide an improved control system for liquid treating solutions for forming chemical conversion type coatings on metal surfaces, the composition and concentration of the active constituents of which are automatically maintained thereby providing a solution of substantially uniform activity.

Furthermore, it is an object of the invention to provide an improved control system of the above type for controlling the operation of an acid phosphate coating solution using nitrite for acceleration which is rapidly and accurately responsive to changes in the demand for nitrite in the bath during the formation of a conversion coating on ferriferous material.

It is a further object of the invention to provide an industrial process analyzer of the above type which will eliminate the need for human operators having special skills.

It is still a further object of the invention to provide an analyzer of the above type which is durable, reliable and easily manufactured and which is also of versatile use, of automatic and simple operation and of simple control.

It is again a further object of the invention to provide an analyzer of the above type the effectiveness of which is ensured by a protective filter which can be cleaned automatically with only momentary interruption of the analysis function and without disassembly thereof.

The above and other objects and advantages of the invention will become apparent upon full consideration of the following detailed description and accompanying drawings.

BRIEF DESCRIPTION OF THE DRAWINGS

FIG. 8 is a diagrammatic time sequence representation of the automatic cleaning program controlled by the signals of FIG. 8.

DESCRIPTION OF THE PREFERRED EMBODIMENT

Figure 1:
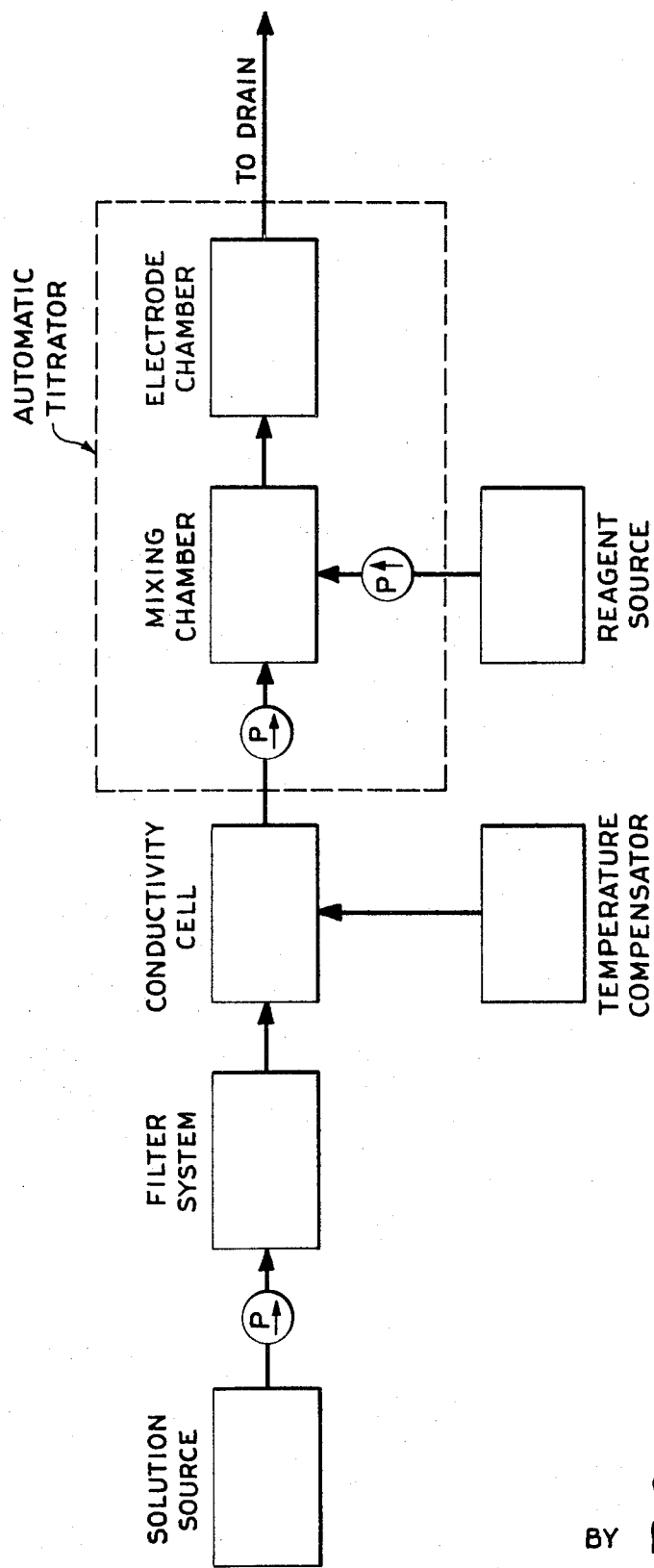
FIG. 1 is a simplified flow diagram depicting an arrangement of the mechanical elements of the present invention.

Referring first to FIG. 1, there is illustrated a simplified flow chart depicting the general mechanical arrangement of the invention. A sample of the process solution to be analyzed is continuously pumped from the solution source to the filter system, where contamination is filtered therefrom. The filtrate thereupon flows through a flow-through type conductivity cell sensing the conductivity of the solution and thence to the automatic titrator. Since conductivity varies with the temperature of the solution passing through the conductivity cell, temperature compensating means responsive to the temperature of the solution is provided to correct the output of the conductivity cell. Within the titrator, a sampling pump which is a metering pump of the positive displacement type, delivers a controlled volume of the sampling solution at a constant rate to the mixing chamber. A source of a reagent solution is connected to a similar metering pump of the positive displacement type which likewise delivers a controlled volume of the reagent to the mixing chamber, wherein the two solutions are intimately mixed. From the mixing chamber, the mixture of sample and reagent flows to an electrode chamber containing a pair of electrodes, namely a reference electrode and a measuring electrode. An outlet is provided through which the continuous flow of fluid analyzed therein passes to an appropriate disposal means.

Figure 2:
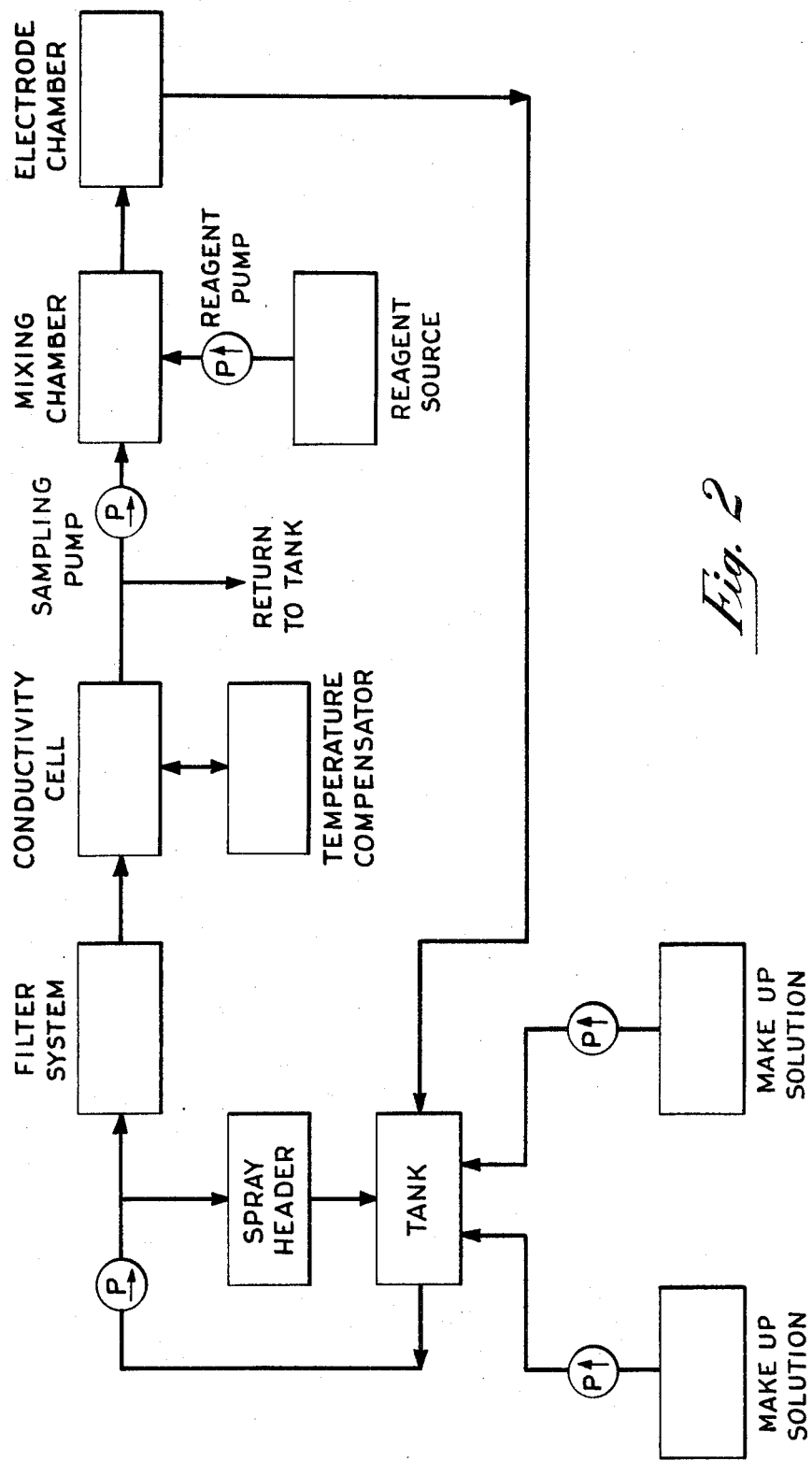
FIG. 2 is a flow diagram depicting an embodiment of an arrangement of the mechanical elements of the present invention as adapted for the surface conversion coating of ferriferous materials by a nitrite accelerated phosphate solution.

FIG. 2 illustrates a particular arrangement of the mechanical arrangement of the elements of the present invention adapted for the surface conversion coating of ferriferous materials by a nitrite accelerated phosphate. The basic mechanical arrangement of the analysis system is identical with that generally described in relation with FIG. 1. However, the input and output systems are different due to their adaption to a specific process to be automatically controlled. The treating solution is pumped from the solution tank to spray headers and nozzles arranged to assure intimate contact of the solution with the work in process. After being sprayed against the work pieces, the solution drains back to the solution tank. Solution from the tank is pumped back to the spray headers, to complete the treatment cycle, through a conduit. The conduit to the headers is provided with a side branch which a portion of the process solution is diverted to continuously pass through the basic analyzer system of FIG. 1. Sources of makeup solutions are connected to chemical proportioning feed pumps, controlled by the control system hereinafter described, to pump makeup concentrate to the solution tank as required. A suitable makeup system is disclosed in detail by U.S. Pat. No. 3,312,189 issued Apr. 4, 1967, owned by the assignee of the present invention. The effluent from the electrode chamber is returned to the solution chamber, either by gravity or by pump means, as design considerations may dictate.

Figure 3:
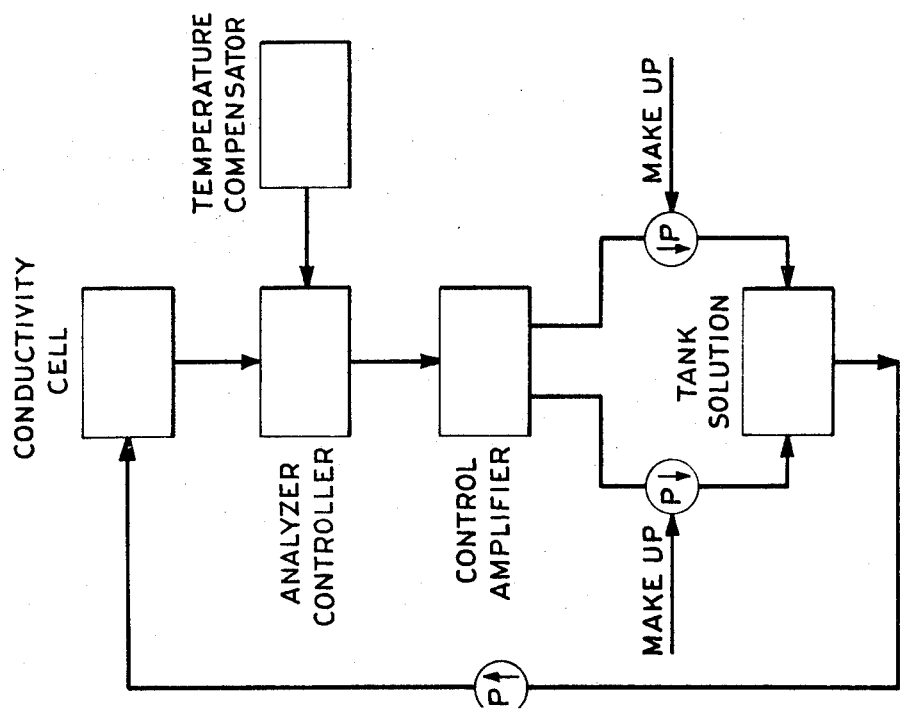
FIG. 3 is a simplified signal diagram schematic view of the conductivity sensor control subsystem of the present invention.

As shown in FIG. 3, which is a signal schematic diagram showing the control system responsive to the conductivity sensor, the electrolytic conductivity of the solution is sensed by the conductivity cell as the solution passes through the cell. In-line flow-through conductivity cells are well-known in the art and obtainable from a wide number of commercial sources. A most suitable cell of this type is obtainable from the Beckman Instrument Company under catalog number VDJ25C, and has three in-line flush rings as electrodes. The conductivity cell may form an element of a bridge type analyzer-controller, such as is fully described in co-pending U.S. Pat. application Ser. No. 702,838, filed on Feb. 5, 1968, now U.S Pat. No. 3,515,094, and owned by the assignee of the present invention. However, a variety of suitable analyzer-control systems are commercially available from sources such as Beckman Instruments, Inc. or the Foxboro Company. In view of the fact that conductivity of the solution varies with temperature changes, a temperature compensator is an essential component of a conductivity measurement system. The overall accuracy of the system is vitally dependent on the temperature compensator, which is the largest single factor affecting the accuracy of its measurements. While a manual compensator may be employed, for many years automatic temperature compensators have been employed based on a thermistor in intimate contact with the solution being measured. The conductivity cell is connected to the analyzer-controller, to form a resistive element of the bridge-type circuit therein, the resistance of which varies in accordance with any change in the temperature of the solution in which it is in contact. Such temperature compensator units are also widely available from sources such as Beckman and Foxboro. A Foxboro Type GX477C automatic temperature compensator may be used with the cell previously mentioned. The output signals from the controller are fed to a control amplifier, having one or more channels, which in turn selectively control electrically driven pumps, which provide makeup solution to the process tank solution, as commanded. Process solution is then continuously returned to the analysis system by a pump and the analysis process is continuously performed and the process solution composition thereby continuously controlled.

A specific embodiment of a conductivity sensing control subsystem hereinbefore generally described is described in detail in U.S. Pat. No. 3,312,189 issued Apr. 4, 1967, owned by the assignee of the present invention, and the operation thereof is fully disclosed therein.

Figure 4:
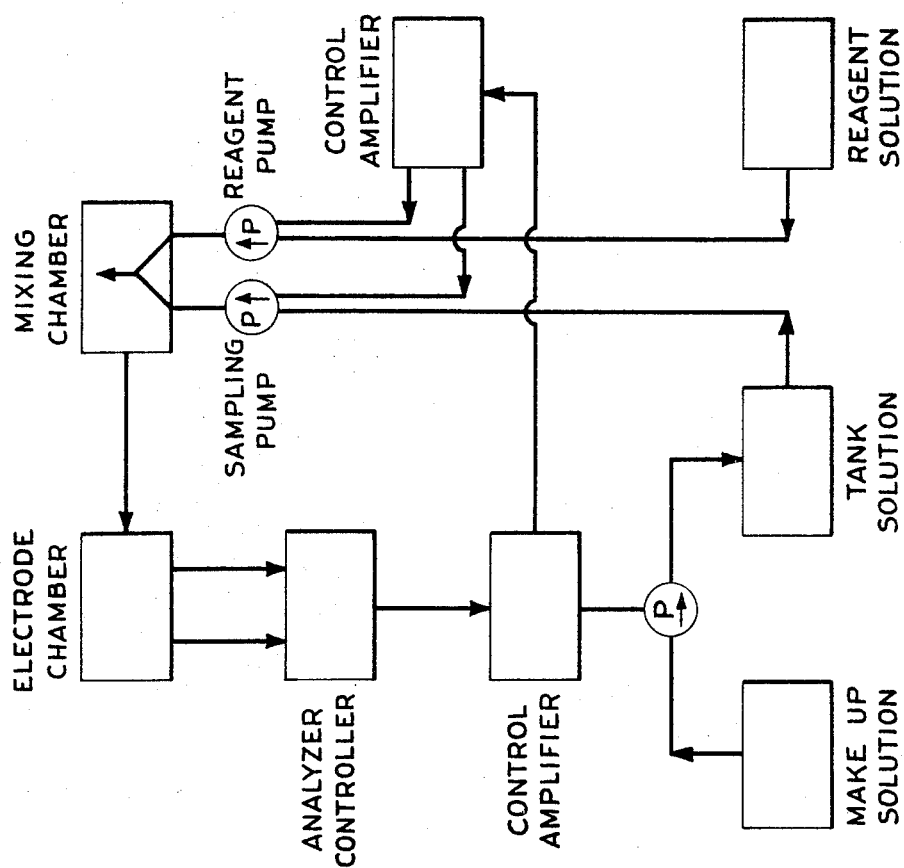
FIG. 4 is a simplified signal diagram schematic view of the automatic titrator controlled subsystem of the present invention.

FIG. 4 illustrates a signal flow diagram of the automatic titrating subsystem. However, before commencing a description thereof, the general background of the provision of this subsystem as an element of the present invention would appear to be in order.

While the measurement of conductivity is an extremely valuable aid in process control, it is not a specific measurement of any one constituent. Electrolytic conductivity is non-specific and is influenced by the contribution of all present in the process solution. In other words, it is a measure of total dissolved ionized solids in a solution. It is very desirable in process control to determine and measure specific ion activity in the process solution. Such well-known ion activity measurements are the measurements of pH and Redox. However, such measurements are only activity measurements on the specific ions. The specific ion electrodes do not measure the actual concentration of a chemical on the solution. In the prior art, it has been found that it is possible to develop a correlation between activity and concentration so that a specific ion measurement may be derived from an activity measurement. However, in many cases solution dynamics are such that an equilibrium system containing certain ions will mask another equilibrium system which includes the ions desired to be measured. In such cases an activity measurement will not produce meaningful new results. As a result the specific ion concentrations cannot be measured by electrochemical sensors and a wet chemistry technique, namely titration, must be employed to ascertain specific ion concentrations.

For example, in the process of producing phosphate coatings on ferriferous metal surfaces by surface conversion accelerated by a soluble nitrite, the voltage signal developed in a Redox electrochemical sensing system is substantially independent of the concentration of nitrite in the solution. The signal becomes substantially constant in value when a very small amount of nitrite is added to the solution. Further addition of nitrite does not change the signal level. In titrating such a solution with the aid of a Redox System, a plot of steady state voltage versus the volume of titrating solution added will yield a gently sloping curve until a point is reached through addition of titrating solution at which a radical shift in voltage occurs. After this radical shift in voltage takes place, further additions of titrate solutions produces another gently sloping curve of voltage versus volume. However, in an electrometric Redox System using a Redox measurement cell, the cell potential is substantially independent of the concentration of nitrite in the bath. The cell output voltage assumes a constant value upon the addition of a small quantity of nitrite and remains linear without change while further additions of nitrite are effected. Thus, the gently sloping curve expected as a reflection of a dominant equilibrium system including nitrite ions and lower oxides of nitrogen is not developed. It is postulated that another equilibrium system is probably masking the system involving nitrite, but the precise reasons for this phenomenon are not known. For these reasons, the lack of response of the voltage in the Redox System to nitrite concentration makes electrochemical measurement of the nitrite concentration ineffective.

For such reasons, in order to be a truly effective multiparameter real-time analyzer, an automatic continuous titration subsystem is provided.

In the block diagram of FIG. 4, process solution is withdrawn from the tank by the sampling pump. The delivery rate of the sampling pump is controlled by a control amplifier. Reagent solution is likewise withdrawn from the reagent source by a pump controlled by the same control amplifier. Both the sampling solutions and the reagent solution are discharged under pressure from their respective pumps and flow to the mixing chamber. Within the mixing chamber, both streams are combined, and forced through a very small orifice simultaneously, in an operation which is similar to homogenization. The emerging stream of combined fluid thereupon impinges on an impact area, again similar to the homogenization process. While homogenization in the true sense of the word cannot take place due to the similarity of physical and chemical properties of the sampling solution and the reagent solution, a forced intimate admixture of the two solutions is effected by passing them simultaneously through the homogenizing means. This forced rapid mixture of the two solutions is essential to accelerate the reaction between the two solutions to produce a real-time analytical read-out in the electrode chamber. The reacted combination of the two solutions thence passes to the electrode chamber, wherein a Redox measuring electrode and a reference electrode are positioned, thereby forming a Redox measurement cell. The output of the Redox system is connected to a potentiometric type analyzer-controller. Processing of the discrete data obtained from the Redox cell is performed in the analyzer-controller, and an error signal generated, when the Redox potential sensed varies from a preselected value. The error signal from the analyzer-controller is fed to the controller for the sampling and titrating pumps. The steady state output of a selected pump is varied by the nature of the error signal received by the controller to vary the delivery rate of either pump by appropriate command signal to the selected pump. As is readily apparent, increases or decreases in the rate of addition of the reagent solution resulted in corresponding increases and decreases in the ion concentration which was the subject of analysis. When the sampling solution is returned to the process solution tank as shown in FIG. 2, control of a selected ion therein can be achieved by simply varying the delivery rate of one of the two pumps. As an alternative illustrated in FIG. 4, an error signal of an analyzer-controller can be transmitted to one or more control amplifiers controlling one or more pumps respectively which will supply an appropriate makeup solution on command to restore the process solution. Regardless of which alternative system is selected, the error signal will no longer be transmitted as soon as the process solution is restored to its preselected state.

To be more specific with respect to the components of the system, the Redox electrode couple employs elements obtainable from a variety of commercial sources, as previously described.

The pumps employed are positive displacement piston diaphragm metering pumps, the output of each which is independently adjustable by means adjusting the pump stroke length while the stroke frequency of each pump remains constant. These diaphragm pumps are solenoid actuated, and the solenoids are actuated by symmetrical in-phase commands from a common electronic drive in order to cause the simultaneous stroking of both diaphragms. Such simultaneous stroking ensures the simultaneous delivery of a precisely metered quantity of each solution to the mixing chamber. This delivery of metered quantities is essential to the accuracy of titrimetic analysis which, as is well-known, depends upon the reacting exact volumes of solutions. As previously discussed, a mixing chamber of the homogenizer type is used to intimately mix the simultaneously delivered solutions. Suitable pumps are commercially available from a variety of sources and particularly satisfactory pumps are manufactured by the Precision Chemical Pump Company. The preferred pumps employed are manufactured by that Company and commercially available from and distributed by the Parker Division of the Hooker Chemical Corporation and are known as Models PX and PY. Model PX differs from Model PY in that Model PX has the mixing chamber hereinbefore described as an additional component of its mechanical arrangement. Each titrator pump subsystem is completed by an electronic drive assembly whose output is applied to the driving solenoid of each pump, activating each solenoid by pulses controlled by SCR's gated by a triggering timing assembly employing solid state trigger circuitry. A suitable electronic drive may be obtained as a standard commercial item available from the Precision Chemical Pump Company as components listed as "Electronic Drive Assembly" Catalog No. 2170, and "Timing Assembly" Catalog No. 2171. The pump assembly in turn can be controlled by a variety of commercially available analyzer-controllers having a millivolt measurement capability of appropriate range to measure the Redox potential from the electrode coupler. The Helmsman Digital Set Point Controller Model MV 0-1000 H.L. Ref. H138 manufactured by the Helen Instrument Company of Toledo, Ohio, employing a potentiometric bridge input circuit, may be employed as a suitable controller. When the pumps are adjusted to deliver their respective streams in the proper ratio, a voltage of approximately 800 millivolts is generated between the electrode couple, which can be measured by the Helmsman controller.

In order to further illustrate automatic titrator comprising a subsystem of the present invention, the following example is provided. It will be understood that the specific composition of the solution as set forth in the example and the processing conditions specified are not intended to be limiting the scope of the present invention as herein described as more fully set forth in the subjoined claims.

EXAMPLE 1

An aqueous surface conversion coating solution for ferriferous metals accelerated by a soluble nitrite additive which also acts as an oxidant to convert ferrous ion to the ferric form was analyzed which had a composition and concentration of active constituents as follows:

W/Vol.

| | |
|---|---|
| $PO_4$ ion | 0.5 – 2.5% |
| $NO_2$ ion | 0.008 – 0.01% | plus zinc or manganese sufficient to form dihydrogen phosphate with the phosphate ion.

The titrating reagent was the cerric ion in the form of cerric sulfate. The titrating solution used was 0.01 normal with respect to the cerric ion. The titrating pump was set to deliver 4 milliliters per minute and the sampling pump was set to deliver 6 milliliters per minute. When both streams were in this ratio, an end point potential of approximately 800 millivolts is measured. Deviations from this end point voltage caused an error signal to be generated by the analyzer-controller. As the $NO_2$ ion concentration increased, a corresponding decrease in the millivolt reading was observed and the $NO_2$ ion decreased a corresponding increase in millivolt increases and decreases in the rate of addition of the cerric ion produced corresponding increases and decreases in the concentration of the $NO_2$ ion in the process solution.

Figure 5:
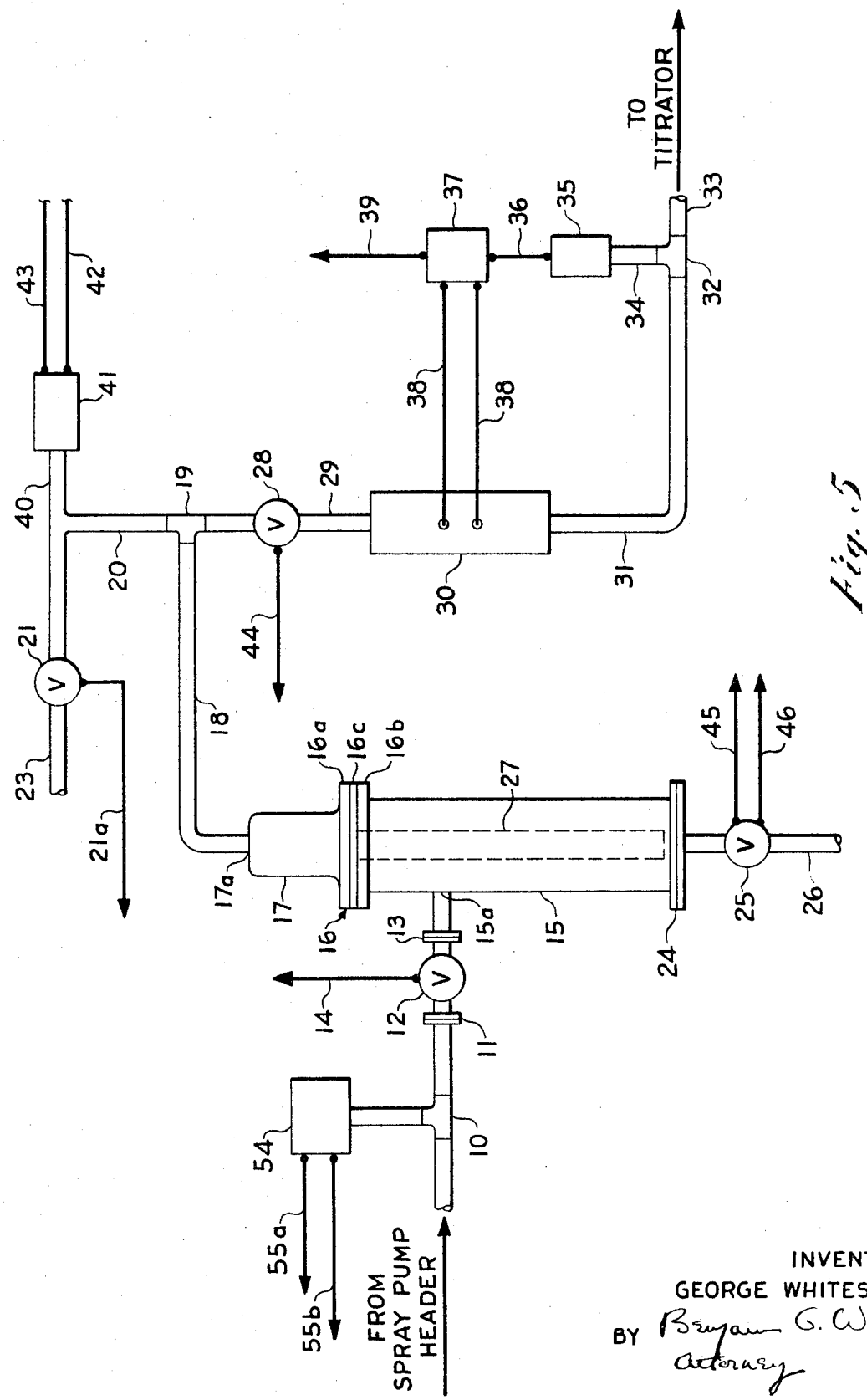
FIG. 5 is an elevational view of an embodiment of the protective subsystem of the present invention, including the filter means therein included.
Figure 6:
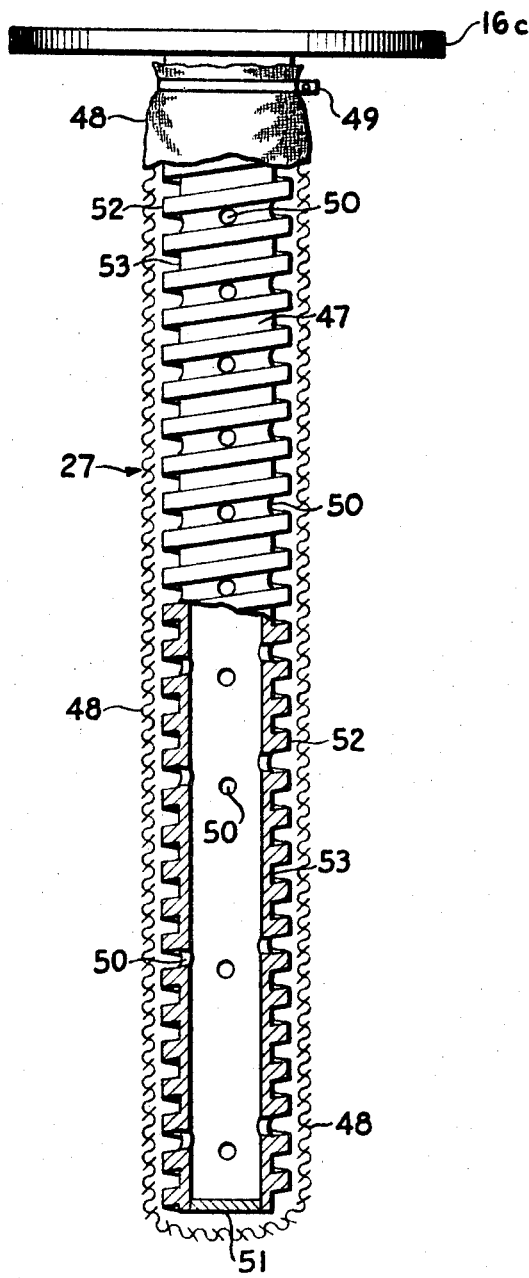
FIG. 6 is a view partly in section illustrating the details of the inner filter element shown in phantom in FIG. 5.

Referring now to the several views of the protective subsystem wherein like parts are identified by like reference numerals, and first to FIG. 5, process solution from a process solution source such as a spray pump header enters the protective subsystem through an inlet tee fitting 10, connecting the intake of the solution as aforesaid with flanged coupling means 11 and the conduit arm of pressure sensitive transducer 54. Flanged coupling means 11 is connected to an electrically actuated normally open valve 12. Intake valve 12 is connected to an inlet 15a to filter chamber 15 by a flanged coupling 13. An electric control lead 14 runs from valve 12 to switch SWa of the cam type program controller illustrated in FIG. 7, and hereinafter more fully described. An upper flanged coupler 16 connects filter chamber 15 to an upper entrance chamber 17. Flanged coupler 16 is an assembly comprising an upper flange 16a and a lower flange 16b, having the upper flange 16c of filter support tube 47 sandwiched in between these flanges. The flange assembly 16 is fastened together by flange bolts 16d. Conduit means 18 connects an upper port 17a in chamber 17 with a tee fitting 19. Tee fitting 19 is connected to conduit 18, to conduit 20 connected to air valve 21 and to analysis system valve 28. Air valve 21 is an electrically controlled normally closed valve connected by conduit 23 to a source of compressed air. An electrical lead 21a runs from valve 21 to switch SWc of the cam type program controller illustrated in FIG. 7 and hereinafter described more fully. The lower end of filter chamber 15 is connected to an exhaust valve 25 by the lower filter body flanged coupling 24. Valve 25 is a normally closed motor driven valve. Electrical control leads 45 and 46 run from valve 25 to SWd and SWe of the cam type program controller, hereinafter more fully described. Valve 25 is connected to an exhaust conduit 26 through which filter cake is discharged. An inner filter element assembly 27, more fully illustrated in FIG. 6, is illustrated in phantom in FIG. 5 within a filter chamber 15. Analysis system valve 28 is a normally open electrically controlled valve. An electrical control lead 44 runs from valve 28 to SWb of the cam type program controller illustrated in FIG. 7, as hereinafter described. Valve 28 is connected to conductivity cell 30 by conductivity cell intake conduit 29. The exhaust end of conductivity cell 30 is connected to tee fitting 32 by conductivity cell exhaust conduit 31. Tee fitting 32 is connected to conduit 31, conduit means 33 connecting to the automatic titrator system and conduit means 34 connecting with temperature compensator 35. Conductivity cell 30 supplies an output voltage through electrical leads 38 which are connected to a junction box 37. Another electrical connection 36 connects the temperature compensator to junction box 37. An electrical cable 39 connects the electrical circuits within junction box 37 to the conductivity subsystem analyzer-controller. Conduit 40 connects a pressure sensitive electric switch 41 to conduit 20, to sense the pressure of the process solution flowing out of filter chamber 17 to conductivity cell 30. An electric lead 42 is connected from one terminal of switch 41 to the timer motor, and electric lead 43 is connected from the other terminal of normally open pressure sensitive switch 41 to the source of electric power for the timer motor closing the power circuit to the timer motor when switch 41 closes in response to a preselected drop in outlet pressure.

Referring now to FIG. 6, inner filter element 27 illustrated in phantom in FIG. 5, extends substantially vertically within filter chamber 17. Filter element 27 is an assembly comprising filter support tube 47 and filter sock 48. Filter support tube 47 is provided with a flange 16c at its upper open end, which flange is clamped between upper flange coupler 16a and lower flange coupler 16b, thereby supporting filter support tube 47 in spaced relationship to the interior walls of filter chamber 15 as shown in FIG. 5. The upper end of support tube 47 is open to permit free communication with its interior, but the lower end 51 of filter tube 47 is closed. Support tube 47 is formed with a plurality of inlet ports 50 communicating with its interior, which ports are disposed in a vertical series of horizontally aligned ports symmetrically grouped about the geometric axis of tube 47. It has been found that a series of 10 vertically spaced groups of four one-eighth inch round holes evenly spaced in the horizontal plane will provide satisfactory flow dynamics through the filter system. Filter support tube 47 is formed with a rugose outer surface preferably having such rugosity in the form of a uniform helicoidal groove, similar to a thread extending substantially along the vertical axis of the exterior of tube 47 and may have a straight side and a flat bottom 53 and top 52. Ports 50 are located within the groove, extending inwardly from the flat bottom 52 thereof. A filter sock 48 is fitted over filter support tube 47, so as to enclose the full length of said tube. Filter sock 48 is held in place by annular filter sock clamp 49 located at the upper end of filter support tube 47 in close proximity to flange 16c. A suitable filter sock material would be woven of dacron material from 0.021 thread with a 240 weave mesh. It should be noted that the upper flat surface 53 of the helicoidal groove formed in the outer face of support tube 47 forms an abutment maintaining the filter sock 48 in spaced relationship from inlet ports 50. This is an important feature of the filter assembly, as it serves to prevent filter sock 48, with collected impurities caked thereon, from coming in direct contact with ports 50. As a result, an assured space is provided between the filter sock 48 and the outlet ports 50, thereby eliminating the clogging of the ports 50 by caked filter sock 48 coming in direct contact therewith and choking the flow of fluid through ports 50.

Figure 7:
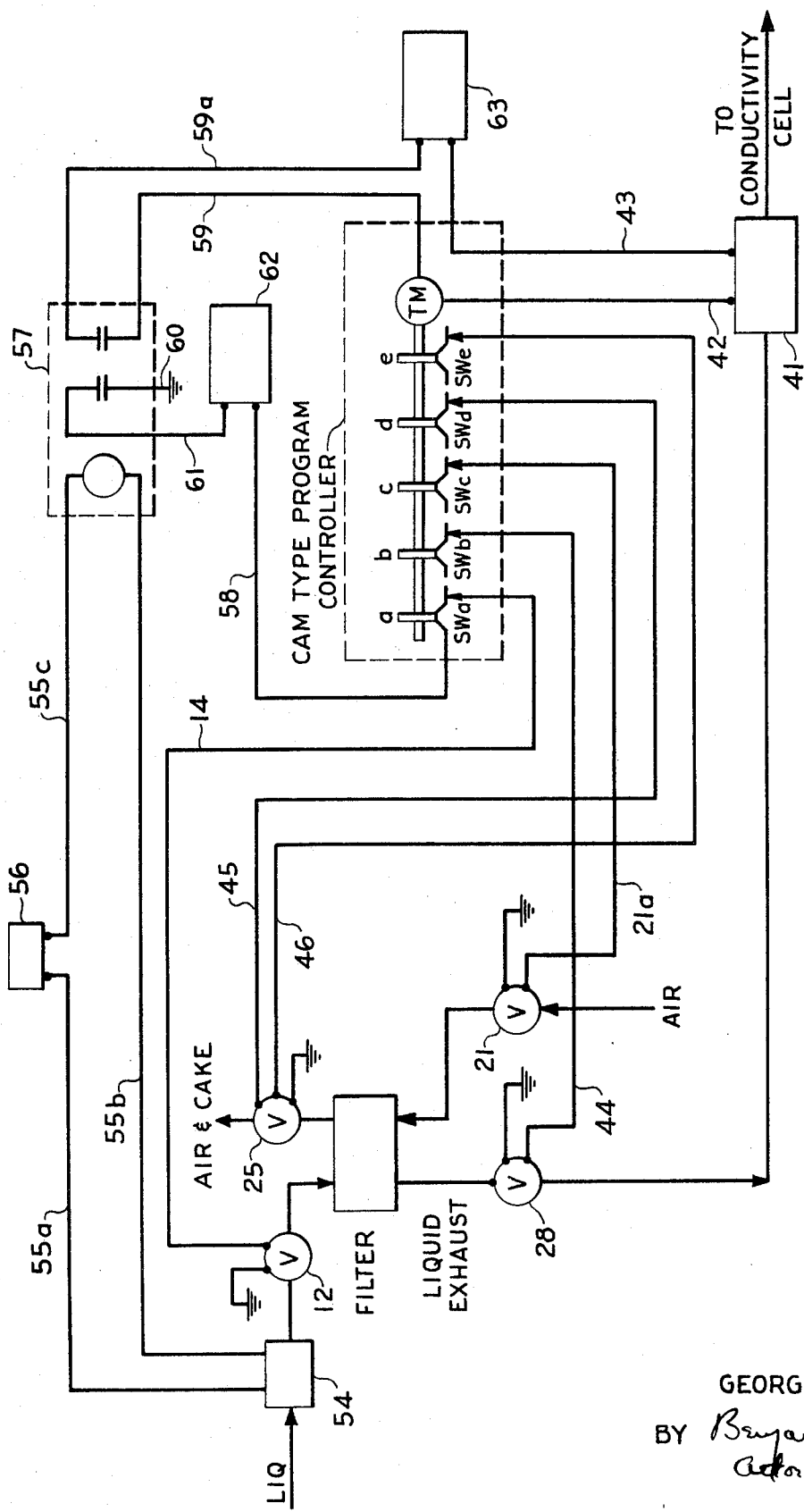
FIG. 7 is a diagrammatic view of the circuitry of a programmed electrical control system of the protective subsystem for the system of FIG. 5.

A complete functional schematic diagram illustrating the control signal circuit and process solution flow within the protective subsystem is shown in FIG. 7. The inlet pressure of the process solution to be analyzed is monitored by a pressure sensitive switch 54 which operates to disconnect the entire analyzer system by opening the circuits to the controller when the switch 54 senses a pressure drop in the intake line, such as that caused during normal starts and stops of a main spray pump supplying solution to a treatment system. Switch 54 is connected to a relay electric power source 56 by electric line 55a. Line 55b connects 54 to relay 57 and the relay circuit is completed by line 55c which connects relay 57 to the power source 56. Relay 57 is a single throw double pole relay which breaks the circuit 59 between the motor power source 63 and the timing motor TM and the connection between the direct current power supply 62 and ground 61 when relay 57 is energized by a control signal responsive to a preselected pressure drop in inlet pressure as previously described. The process solution flows through the pressure sensitive transducer 54 and thence proceeds to flow through intake valve 12. From intake valve 12 the solution flows through the filter assembly and out through liquid exhaust valve 28 and thence through pressure sensitive switch 41 to the conductivity cell intake conduit 29. Valves 12, 28, 21 and 25 are all electrically controlled valves, the sequential operations of which are controlled by a cam type program controller. This controller is a motor timer in which a synchronous motor TM drives a cam shaft through a gear train. A plurality of cams (a, b, c, d and e) are arranged on the cam shaft, which cams are cut in conformity with the time cycle depicted in FIG. 8. A plurality of switches, SWa, SWb, SWc, SWd and SWe are operated in a preset sequence by these cams, which cams determine the opening and closing of each switch during a revolution of the cam shaft. The controller shown is a five cam 1 minute cycle conventional cam timer of a type available from many commercial sources. A suitable timer is available from the Eagle Signal Division of the E.W. Bliss Company and bears Catalog No. Eagle MP4A608-540. SWa controls the operation of valve 12. SWb controls the operation of valve 28. SWc controls the operation of valve 21. SWd controls the opening or motor driven valve 25 and SWe controls the closing of valve 25.

In operation, pressure sensitive switching transducer 41 is set to close the circuit energizing the timing motor of the cam type program controller when a pressure drop of 25 to 50 percent of the main line pressure is sensed in the stream flowing from the filter to the conductivity cell resulting from a choking of the flow due to clogging of the filter sock 48. The cleaning cycle of filter element 27 is then initiated, which cycle, as seen from the time cycle diagram of FIG. 8, is approximately 60 seconds. Means are provided in the cam type program controller to override the signal from pressure sensitive switch 41 to ensure operation of the timer through the full 60 second cycle. A variety of such means are known in the art and a designer may choose from such means as an auxiliary cam switch or a time delay relay for example. First, valve 12 and 28, which are normally open, are closed by energizing their solenoids through the closing of circuits controlled by SWa, SWb respectively. The closing of these valves isolates the filter from the liquid circuit of the subsystem. Once isolation is affected by the closing of these valves, valve 21, which is normally closed, is opened by energizing its solenoid through the closing of switch SWc. Air under pressure is admitted to the filter system in a direction opposite to that direction in which the liquid flows as will hereinafter be described in further detail. Simultaneously with the opening of valve 21 admitting air to the filter, valve 25 which is a normally closed motor driven valve is open by the closing of SWd, thereby permitting the air under pressure to pass through filter tube support ports 50, and through a filter sock 48 carrying entrained therewith the filtrate collected on its upstream surface. At the time when the filter chamber is isolated from the liquid circuit by the closing of the liquid valves as aforesaid, a small volume of liquid remains entrapped within the body of the filter. When air under pressure is admitted to the system as previously described, the impact of this air on the residual liquid forms a water hammer which drives this liquid through the ports 50 of filter support tube 47 with considerable force, thereby shattering the filter cake collected on the upstream exterior surface of filter sock 48. This liquid with entrained fragments of filter cake is then exhausted through valve 25 and the air which follows it blows out the residual filter cake by action of its pressure. Upon completion of the blow down cycle, the actuating signal is removed from valve 21 by the opening of SWc and valve 21 resumed its normally closed condition, thereby cutting off the supply of air to the filter system. Thereupon, liquid circuit valves 12 and 28 are restored to their normally open condition by the opening of switches SWa and SWb, thereby removing the energizing signal from their respective solenoids. Valve 25 remains open for a very short period of time after liquid flow is restored in order to complete flushing out of the system by permitting a small quantity of process solution to escape through valve 25 as waste. As will be seen from examination of FIG. 8, this portion of the cycle is approximately 4 seconds in duration. Thereupon switch SWe closes which provides a signal closing motor driven valve 25, thereby closing off the exhaust from valve chamber 15. The cam type program controller stops when it is timed out. The cleaning cycle will start again when an energizing pressure drop is sensed at pressure sensitive switch 41.

Referring now to FIG. 5, process solution from the spray header enters the analyzer at intake connection 10, at which point the inlet pressure is sensed by pressure sensitive switch 54 which exercises a control function hereinbefore described in detail. Process solution continues into the system through coupling 11, intake valve 12, and coupling 13 into filter chamber 15 through a port in the wall of filter chamber 15. The process solution continues through the system by flowing through the inner filter element illustrated in phantom in FIG. 5, material which would contaminate subsequent downstream analysis means being filtered from the solution to be analyzed at this point. The solution then flows up into upper filter chamber 17 and thence through conduit 18 to a tee fitting communicating with conduit 20 to air valve 21 pressure sensitive switch 41 and filter exhaust valve 28. From exhaust valve 28 the solution to be analyzed then flows to conductivity cell 30 through a connecting conduit 29 where the conductivity of the solution is measured. Solution then flows from conductivity cell 30 through conduit 31 to a tee fitting 32 which is connected to a temperature compensator 35 hereinbefore described and tube conduit 33 connecting to the automatic titrator hereinbefore described. An electrical lead 36 connects the output of the temperature compensator to a junction box 37. Electrical leads 38 are connected to the electrodes of the conductivity cell 30 and also enter junction box 37. A cable 39 is connected to the interior terminals within junction box 37 to carry their output signals to the conductivity analyzer hereinbefore described. The pressure along the downstream side of the filter is monitored by pressure sensitive switch 41 which is connected to the solution stream through conduit 40. When the pressure in the solution stream drops below a preselected value due to the accumulation of contaminating matter on inner filter element 27, pressure switch 41 closes thereby energizing the timer motor by connecting together electric lead 42 which leads from the pressure sensitive switch to the timer motor with electric lead 43 which leads from the motor power source to pressure sensitive switch 41. One side of air inlet valve 21 is connected to tee fitting 19 through conduit 20 and its other side is connected to a source of compressed air through conduit 23. Inlet valve 12 and exhaust valve 28 are normally open to permit the process solution being sampled to flow freely to the analysis system. However, when the filter cakes up, pressure drops in the outlet portion of the filter system, which pressure drop is sensed by pressure sensitive switch 41. When this pressure drop reaches a preselected level normally open valves 12 and 28 are closed by an electrical signal as hereinbefore described. Thereupon air valve 21 opens and permits air to enter the filter system traveling in the reverse direction from the solution flow stream. Valve 25, which is a normally closed motor driven valve is opened, thereby permitting the filter to be purged as hereinbefore described. Contaminating matter dislodged from the exterior from filter sock 48 is expelled through exhaust conduit 26 after preceding through open valve 25. The purging cycle continues as hereinbefore described until the system times out. The air intake valve and the exhaust valve are closed, which is their normal condition. Likewise the liquid inlet valve 12 and the liquid exhaust valve 28 are open which is their normal state, thus permitting renewed continuous flow of the process solution to the analysis system.

It will thus be apparent that the new apparatus may be used to provide continued analysis information with a minimum of down-time of the analysis system for cleaning purposes. The cleaning cycle herein described is substantially less than 1 minute in duration. In practice, the frequency of the cleaning of the conductivity cell has been reduced from a frequency of one to three cleanings in a 24 hour period to one cleaning in a period of from 30 to 60 days.

The apparatus of the present invention is highly advantageous in cases where a specific ion concentration in a process solution must be carefully controlled on a real-time basis. It will be readily apparent from the disclosure of the specific embodiment of the invention that great flexibility in this regard is provided. By proper selection of the electrodes and titration solution, it would be possible to control many different ion concentrations, such as sulfate, chloride, chromate, phosphate or iron. In an appropriate case Redox or millivolt measurement is made on the reacted mixture, while in other cases, a pH measurement is made to determine the balance between sample solution and titrating solution.

One of the more specific advantages of the apparatus is its ability to provide such ion concentration information on a continuous basis without resort to the colormetric method. The colormetric method is dependent on particular color values indexed to a particular titration and thus limits the flexibility of use of the analysis equipment.

A further advantage of the present apparatus lies in the fact that general ion activity information is reliably and continuously supplied through conductivity measurement, simultaneously with a measurement of a specific ion concentration.

Yet another advantage is that the current present apparatus processes the multiparameter analytical information reliably and continuously developed by its analytical subsystems to control the composition of a process solution on a real-time basis.

It should be understood, however, that the specific apparatus herein illustrated and described is intended to be representative only, as many changes may be made therein without departing with the clear teachings of the invention. Accordingly, reference should be made to the following claims in determining the full scope of the invention, as it will be appreciated that the invention is susceptible to modification, variation and change without departing from the proper scope and fair meaning of the subjoined claims.

I claim:

1. In a multiparameter system for the continuous on-stream real-time analysis, surveillance and control of a process solution, the improvement consisting of means to continuously sample said solution, in-line flow through temperature compensated conductivity sensing means, in-line selectively cleanable filter means connected between said sampling means and said sensing means, means responsive to system dynamics to cyclically clean said filter, a source of a reagent, positive displacement metering pumps connected to said reagent source and to said conductivity sensing means, a mixing chamber having homogenizing means, conduit means from the output sides of said pumps connected to a junction, connecting means from said junction to said mixing chamber, conduit means from said mixing chamber to an electrode chamber, an electrode coupler in said electrode chamber for the electrometric measurement of a predetermined ion, outlet means from said electrode chamber, controller-analyzer means connected to said electrode coupler and to said conductivity sensing means providing error signals when said solution parameters deviate from preselected parameters, and means responsive to said error signal restoring said solution to a condition having said preselected parameters.

2. The improvement of claim 1 wherein the electrode coupler is a redox potential measuring means.

3. The improvement of claim 1 wherein said electrode coupler is a pH measuring means.

4. In a system for the automatic continuous on-stream analysis of a liquid process solution protected by an intake filter, the improvement comprising an in-line filter having at least one inlet connection and at least one exhaust connection, electrometric liquid analysis means, pressurized liquid intake means connecting said filter to said liquid, liquid exhaust means connecting said filter to said analysis means, pressure sensitive transducer means located in said exhaust means sensing the liquid pressure within said exhaust means generating an error signal when the pressure of said liquid drops below a predetermined level, normally open controlled valve means connected between said filter and said intake means controlling liquid input, normally open controlled valve means connected between said filter and said analysis means controlling liquid exhaust, a source of pressurized fluid, means connecting said fluid to said filter to effect the flow of fluid through said filter in a reverse direction from said liquid flow direction expelling entrained filter cake therewith, normally closed fluid intake controlled valve means connected between said filter controlling the input of said fluid to said filter, normally closed fluid exhaust controlled valve means controlling the exhausting of said fluid and said filter cake, and programmed control means actuated by said error signal (a) closing said normally open valves, (b) opening said normally closed valves and (c) restoring said valves to their normal mode in a predetermined sequence.

5. The improvement of claim 4 wherein said analysis means is adapted to automatically and continuously analyze a plurality of parameters.

6. The improvement of claim 5 wherein said analysis means is adapted to analyze conductivity and oxidation reduction potential.

7. The improvement of claim 4 wherein said controlled valves are adapted to be electrically actuated and said programming means is adapted to switch a source of electricity actuating said valves in a predetermined sequence.

8. The improvement of claim 7 wherein said programming means is adapted to transmit command signals to said valves in a sequence comprising (1) closing said liquid controlling valves in said intake and said exhaust, (2) opening said fluid intake and said fluid and filter cake exhaust valves, (3) causing air to flow through said filter for a predetermined period of time, (4) closing said fluid intake and exhaust valves and (5) opening said liquid control valves.

9. The improvement of claim 8 wherein said fluid is gaseous.

10. The improvement of claim 8 wherein said fluid is a liquid.

11. The improvement of claim 4 wherein said fluid source comprises a combination of discrete liquid and gaseous sources, said controlled intake and exhaust valves are three-way valves, and said programmer is adapted to control said three-way valves to cause said liquid and said gas to separately flow through said filter in accordance with a predetermined sequence.

12. In an integrated multiparameter analyzer for the continuous real-time measurement, surveillance and correction of a process solution by the electrometric method, an automatic titrator comprising a means for sampling said solution, a source of a liquid titrating reagent, a positive displacement metering pump connected to said sampling means to provide a continuous sample of said solution, a positive displacement metering pump connected to said reagent to provide a continuous flow of said reagent, a mixing chamber having a single small restricted homogenizing entrance orifice, conduit means connecting the output sides of said pumps to junction means connected with said orifice, a homogenizing impact area within said mixing chamber, an electrode chamber, conduit means connecting said mixing chamber with said electrode chamber through which said mixed fluid flows, electrometric electrodes located within said electrode chamber, exhaust means connected with said electrode chamber to permit the continuous flow through of the homogenized analytical fluid, a controller-analyzer connected to said electrodes to provide at least one error signal when analysis of said fluid indicates deviation of said process fluid from a preselected condition.

13. The improvement of claim 12 wherein said controller-analyzer is adapted to provide an error signal to a control amplifier which is adapted to discretely control the output of each of said pumps.

14. The improvement of claim 13 wherein said controller-analyzer is adapted to provide an error signal which is adapted to control the outputs of said sampling and reagent pumps and an additional error signal which is adapted to control the addition of matter to said process solution to effect its restoration to said preselected condition.

15. The improvement of claim 12 wherein said electrodes are adapted to measure pH.

16. The improvement of claim 12 wherein said electrodes are adapted to measure Redox potential.

* * * * *